Oct. 6, 1970 F. A. WOOD 3,533,036

TELEVISION SWEEP TRANSFORMER

Filed Jan. 29, 1969 2 Sheets-Sheet 1

Inventor
Frank A. Wood
By Cornelius J. O'Connor
Attorney

TELEVISION SWEEP TRANSFORMER

Filed Jan. 29, 1969

Inventor
Frank A. Wood
By Cornelius J. O'Connor
Attorney

United States Patent Office 3,533,036

Patented Oct. 6, 1970

3,533,036

TELEVISION SWEEP TRANSFORMER

Frank A. Wood, Elmhurst, Ill., assignor to Zenith Radio Corporation, Chicago, Ill., a corporation of Delaware Filed Jan. 29, 1969, Ser. No. 794,970

Int. Cl. H01f *15/02, 27/30*

U.S. Cl. 336—96 3 Claims

ABSTRACT OF THE DISCLOSURE

A housing for the primary and secondary coils of a television sweep transformer comprises an open cup with an offset chamber that receives the high potential terminal of the secondary and a hollow center post upon which the coils are mounted and through which a magnetic core is received. The offset chamber includes an egress for the output lead connected to the high potential terminal of the secondary and also includes a shouldered abutment for establishing a minimum radius of curvature for the output lead to inhibit corona formation about the lead. The cup and chamber are filled with an insulating material to encapsulate the coils, the high potential terminal and the output lead.

BACKGROUND OF THE INVENTION

This invention relates to high voltage television sweep transformers.

The accelerating potential for the final anode of a television receiver cathode-ray tube is conventionally derived from the horizontal deflection system of the receiver. Basically, flyback pulses appearing in the horizontal output or sweep transformer are stepped-up in voltage by a tertiary coil, which is coupled to the transformer, and then applied to a rectifier tube which develops a unidirectional high voltage for application to the final anode of the tube. It is the pulse nature of the voltage induced across the tertiary coil, as much as its magnitude, that poses problems in protecting the deflection system from the effects of a high voltage break-down.

The problems attendant upon high voltage generation in a television receiver, namely, the formation of a corona discharge and voltage arc-over to lower potential surfaces, have always been a concern in the design of the horizontal output system of the receiver. Corona constitutes a gaseous discharge attributable to the ionization of the air immediately adjacent a surface that supports a high potential electric field. This surface can be an electrical terminal or any other point of high field intensity, for example, a kinked or sharply bent conductor lead is known to be productive of corona. Upon ionization the dielectric effectiveness of air is greatly diminished and as a consequence, a voltage arc or flash-over is readily sustained. Moreover, corona is productive of interference signals in the form of electrical noise and further tends to attack materials, insulative as well as conductive, in the immediate vicinity of the discharge thus aggravating further the problem of insulating for high voltages.

In color television receivers final anode voltages range upwards from 20,000 volts so that the induced voltage appearing across the tertiary coil is very substantial. Moreover, the trend in the industry today is to physically reduce the size of the receiver, which necessarily requires locating the components of the horizontal deflection system in close proximity to each other as well as to other elements of the receiver. In this circumstance, even without consideration of the higher anode potentials employed in color television receivers, corona and arc over problems are aggravated because of the close physical placement of the sweep transformer, in particular, to other components of the receiver.

Customarily, the approach to corona prevention is to coat all exposed high potential surfaces with an insulating material to avoid an air dielectric adjacent those surfaces. An obvious shortcoming of this expedient is one of economics since it requires the assembler to coat exposed conductive surfaces near the high potential terminal after all necessary electrical connections have been made, a costly and time consuming operation.

A particularly attractive sweep transformer construction that affords a measure of protection against corona discharge is described and claimed in Pat. 2,988,715 which issued to Leo A. Gizynski et al. on June 13, 1961 and is assigned to the same assignee as the subject invention. This transformer arrangement contemplates a cup for supporting the tertiary coil of the transformer in such a fashion that a subsequently introduced insulating compound completely surrounds the coil. While this construction has proven very satisfactory over the years, the recourse to higher anode potentials together with the trend to more compact television receiver construction has made it necessary to seek an improvement on the Gizynski et al. design in order to more effectively combat corona discharge and high voltage break-down.

It is therefore an object of the invention to provide an improved high voltage transformer construction for a television receiver.

It is also an object of the invention to provide a sweep transformer construction in which the tertiary coil output terminal is afforded special protection against corona discharge.

It is another object of the invention to provide a high voltage transformer construction finding particular application in compact television receiver construction.

SUMMARY OF THE INVENTION

In accordance with the invention a housing for supporting a television sweep coil having a high potential terminal and a low potential terminal comprises an open cup having an internal span that is greater than the external diameter of the coil. The cup has an offset chamber for receiving the high potential terminal. This chamber includes a wall portion that provides an egress for an output lead connected to the high potential terminal. The egress directs the output lead away from the low potential terminal to lengthen the air path between the high and low potential terminals. The chamber further comprises means for establishing a minimum radius of curvature for the output lead between the high potential terminal and the chamber egress to inhibit corona formation in the vicinity of the curved portion of the lead.

DESCRIPTION OF PREFERRED EMBODIMENTS

The features of the present invention which are believed to be novel are set forth with particularity in the appended claims. The organization and manner of operation of the invention, together with further objects and advantages thereof, may be best understood by reference to the following description taken in connection with the accompanying drawings, in the several figures of which like reference numerals identify like elements, and in which:

Figures 1, 2, 2A, 5:
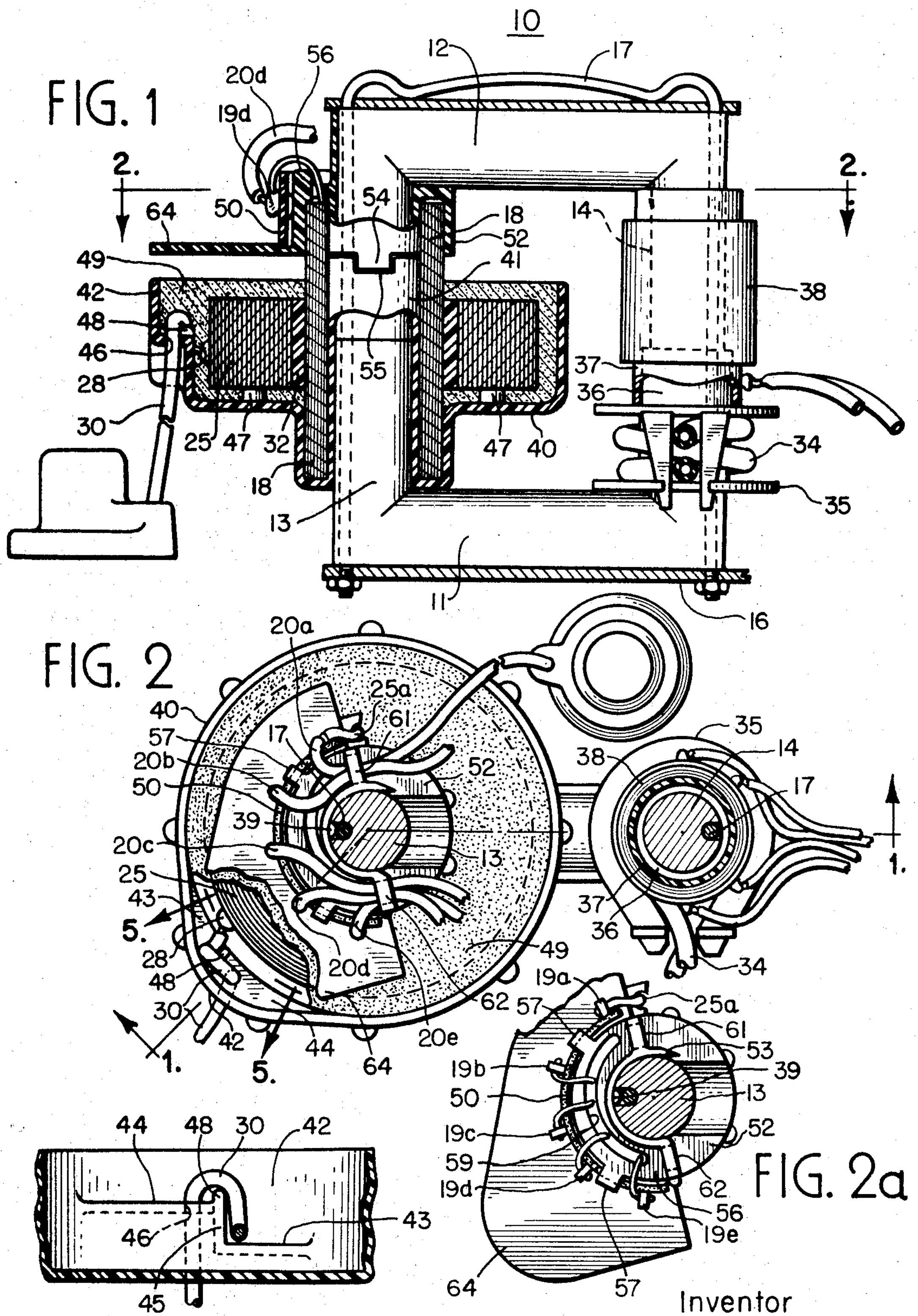
FIG. 1 is a side view, partly in section, of a sweep transformer constructed in accordance with the invention.
FIG. 2 is a sectional view of the sweep transformer taken along lines 2—2 of FIG. 1.
Figure 4:
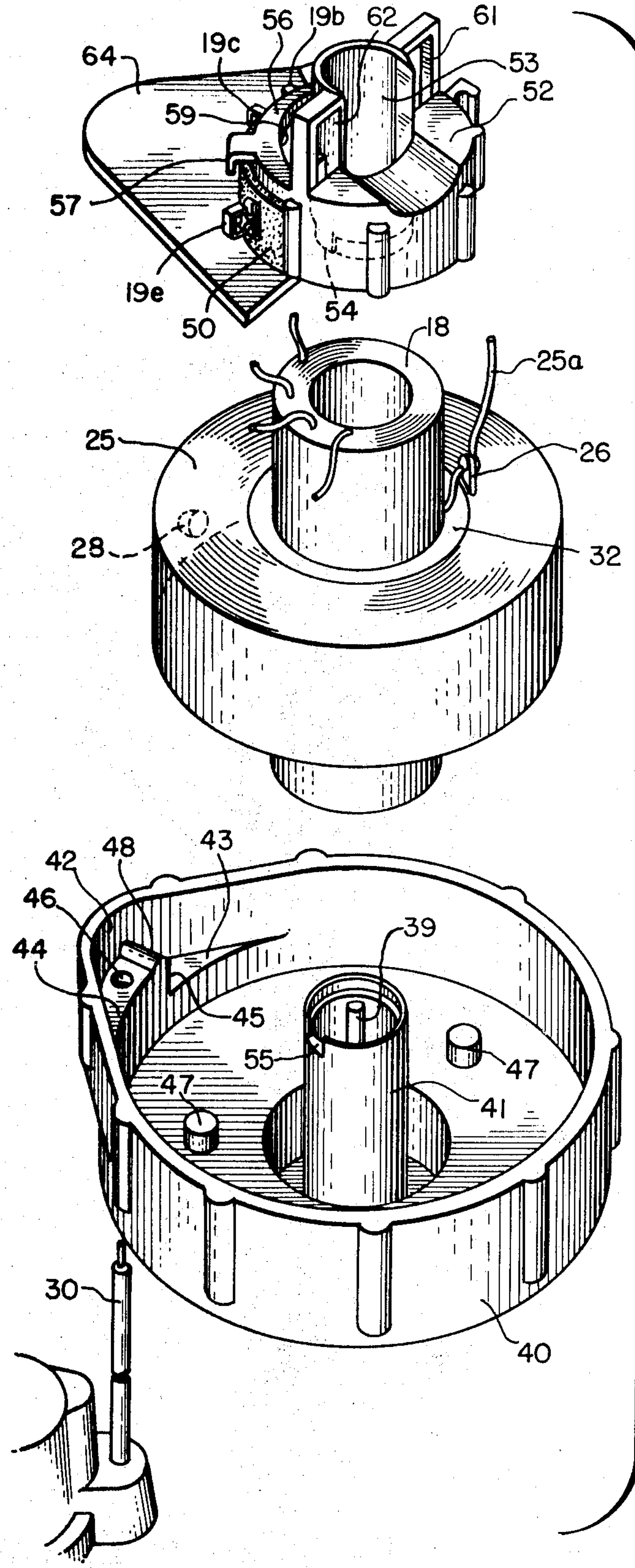
Figure 3:
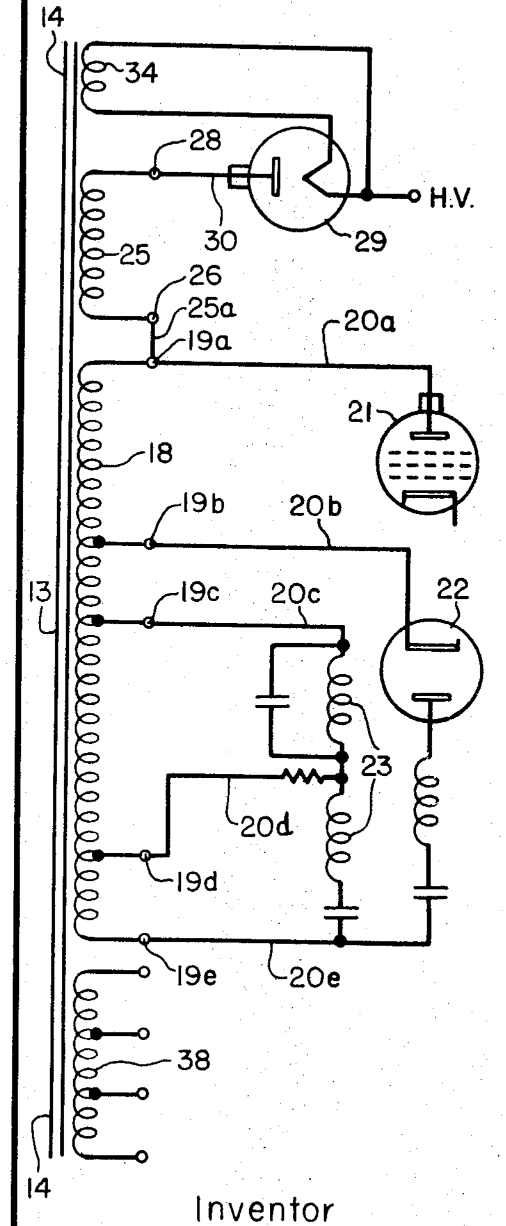

FIG. 2*a* is a detail of the terminal cap for the transformer coil housing shown in FIG. 2;

FIG. 3 is a schematic representation of the sweep transformer of FIG. 1 together with portions of its associated circuitry;

FIG. 4 is an exploded perspective view of the sweep coil and housing assembly employed in the transformer shown in FIGS. 1 and 2; and FIG. 5 is a view taken along lines 5—5 in FIG. 2 illustrating a detail of the coil housing.

Referring now in particular to FIG. 1, the sweep transformer 10 shown therein is of a type employed in the horizontal deflection system of a color television receiver and to that end comprises a pair of C-shaped cores of magnetic material arranged in an abutting relation to form a closed magnetic circuit having, as viewed in FIG. 1, a pair of horizontally disposed legs 11, 12 and a pair of vertically disposed legs 13, 14. The cores are mounted upon a base member 16 and fastened thereto by a U-shaped clamp 17, the legs of which are seated in elongated grooves in cores 13, 14.

The windings for transformer 10 include a primary 18 which encircles core leg 13 and which can be wound in autotransformer fashion with a plurality of taps therealong that are connected to a like plurality of output terminals **19*a*–19*e* by primary break-out leads. These break-out leads are shown emanating from primary 18** in FIGS. 2*a* and 4, however, in order to avoid cluttering the drawings, they have not been assigned reference numerals. A corresponding plurality of output leads **20*a*–20*e* serve to couple terminals 19*a*–19*e*, respectively, to the anode of the horizontal output tube 21, to the cathode of a damper diode 22, to one end of the horizontal deflection coil 23, to the midpoint of the deflection coil, and to the other end of coil 23 and the anode of damper 22, see FIG. 3. The sweep transformer also includes a tertiary coil 25 having an input terminal 26 which is connected to the upper end of primary 18, that is, output terminal 19*a*, via conductor 25*a*. Coil 25 is further provided with a high potential output terminal 28 which is connected to the anode of a high voltage rectifier 29 by a conductor 30. Coil 25 encircles primary 18 but is spaced therefrom by a support ring 32** of insulating material.

Sweep transformer 10 further includes an energizing winding 34 for high voltage rectifier 29 which comprises two turns of a conductor wound upon a spool 35 of insulating material. Spool 35 is mounted upon core leg 14 and includes a keying arrangement for indexing it thereon. Spool 35 also includes a sleeve-like extension 36 which receives, in coaxial fashion, and supports a tubular insulating liner 37 upon which a pulse developing winding 38 is wound. Winding 38 serves to derive control signals from the sweep transformer for application to the phase detector of the horizontal sweep oscillator and to the convergence circuits of the receiver. Since neither the phase detector nor the convergence circuitry relate to the subject invention, no description of these circuits is deemed necessary.

In accordance with the invention transformer 10 includes a housing for supporting coils 18 and 25 which comprises an open cup 40 having an internal span which is greater than the external diameter of tertiary coil 25 and an integrally formed hollow post 41 centrally disposed therein, see FIG. 4. Preferably, cup 40 is a molded piece of insulating material which is formed, for example, of a flame retardant polypropylene. Post 41 is internally dimensioned to receive core leg 13 and has an external diameter proportioned to accommodate primary 18. The bottom wall of cup 40 is provided with a plurality of pedestals 47 for spacing coil 25 from that wall to permit a substantially complete encapsulation of the coil by an insulating material. The inner wall of post 41 includes a longitudinally extending key 39 that cooperates with the grooved portion of core leg 13 to index the cup upon the core. Cup 40 further comprises an offset chamber 42 for receiving high potential terminal 28 and one end of output lead 30. Chamber 42 is bounded by the outer wall of cup 40 and includes a pair of spaced ledges 43, 44 and an interconnecting riser 45 which establish first and second recess portions within the chamber. Ledge 43 and riser 45, in conjunction with the wall of chamber 42, form a recess for receiving terminal 28 while ledge 44 and the chamber wall form the second recess. Ledge 44 is apertured to provide an egress 46 for the output lead 30 connected to high potential terminal 28. Egress 46 is so located in chamber 42 as to direct lead 30 away from the lower potential terminals **19*a*–19*e*, as well as away from the essentially zero potential surfaces exhibited by core elements 11–14 and U-clamp 17. In directing lead 30 away from these low potential surfaces, the corona discharge path between high potential terminal 28** and these surfaces is lengthened thereby preventing a voltage breakdown therebetween.

Chamber 42 further comprises a means for establishing a minimum radius of curvature for output lead 30 in its span between the two recess portions of the chamber, that is, over its length between high potential terminal 28 and egress 46. More particularly, the top of riser 45 is provided with a rounded shoulder or abutment 48 which establishes a minimum radius of curvature for lead 30. In this fashion, shoulder 48 prevents the lead from being sharply kinked thus eliminating a potential source of corona formation. Finally, the chamber is filled with a quantity of insulating compound 49 which completely envelopes coils 18 and 25 as well as terminals 26 and 28 of tertiary coil 25.

The coil housing for sweep coils 18, 25 additionally includes a terminal strip 50 formed of a segment of heat resistant thermosetting insulating material. Strip 50 supports the above-mentioned transformer output terminals **19*a*–19*e* and, in turn, is supported upon a cap 52 which, like cup 40, is of insulating material and can constitute a molded piece of polypropylene. Cap 52 comprises a hollow sleeve 53 which receives core leg 13 and is formed with an indexing lug 54 adapted to cooperate with a key well 55 atop cup post 41. Circumferentially disposed about sleeve 53, and integrally formed therewith, is a collar 56, having a pair of tabs 57 for retaining terminal strip 50. Collar 56 is provided with an arcuate slot 59 which is in registration with a portion of the periphery of primary coil 18 to afford the primary break-out leads access to terminals 19*a*–19*e***, see FIG. 2*a*. As structurally illustrated in FIG. 2, output leads **20*a*–20*e* are also secured to terminals 19*a*–19*e*, respectively, to complete electrical connections to the taps on primary 18** via the primary break-out leads.

Disposed atop collar 56, and integrally formed therewith, are strain relief provisions for output leads **20*a*–20*e*. More particularly, see FIGS. 2 and 4, a pair of windows 61, 62 are formed in opposite sides of a planar extension of sleeve 53 to receive leads 20*a*, 20*b* and 20*c*–20*e*, respectively. Windows 61, 62 establish a dress or routing pattern for these leads and, more importantly, serve to prevent or relieve any strain on terminal connections 19*a*–19*e* when output leads 20*a*–20*e*** are subsequently manipulated to effect connections to other parts of the receiver circuitry.

While it has been determined that a coil housing employing the construction of cup 40 and chamber 42 offers ample protection for inhibiting corona formation in most applications, as a further deterent to corona and voltage break-down cap 52 is provided with a corona barrier comprising a radially projecting shelf 64 which extends across cup 40 to overlie substantially all of chamber 42. A corona discharge tends to creep along intermediate surfaces as it seeks a low potential surface, and accordingly the interposing of shelf 64 between high potential terminal 28 and the low potential surfaces presented by the transformer terminals, etc., serves to lengthen the discharge path and thereby provide an additional measure of high voltage break-down protection.

Insofar as practicing the invention is concerned, the assembly of coils 18 and 25 with cup 40 and cap 52 will now be discussed. An initial step contemplates securing primary winding 18 and tertiary 25 to support ring 32 with a suitable adhesive, impregnating this subassembly with varnish and then mounting the unit on cup post 41. The free end of conductor 30 is passed through chamber egress 46 and soldered to the high potential terminal 28 of coil 25. Terminal 28 is positioned in the recess defined by shelf 43 and riser 45 and that portion of conductor 30 within chamber 42 is then arranged over shoulder 48 with a radius of curvature that precludes a sharp bend or kink in the conductor. Coils 18 and 25 are then encapsulated by filling cup 40 with an insulating compound such as a thermosetting polyester resin.

Cap 52 is now fitted to cup 40 with their respective keying provisions 54 and 55 in registration and with the primary break-out leads extending through slot 59. This keying provision insures that shelf 62 is properly positioned over chamber 42 to provide the added measure of security against corona formation. The primary break-out leads are then soldered to terminals **19*a*–19*e***, as shown in FIG. 2*a*, after which cup 40, and cap 52, as well as pulse winding 38 and rectifier filament 34 are fitted on their assigned core legs 13, 14 and the entire assembly secured to base 16 by clamp 17. The output leads **20*a*–20*e* are threaded through their assigned strain relief windows and electrical connections completed between them, the primary break-out leads and terminals 19*a*–19*e***.

In summary there is disclosed a high voltage transformer construction employing a novel housing for supporting a high potential electrical coil. The high potential terminal of the coil is positioned within a chamber which, in turn, is configured to provide a lead dress for a conductor connected to the output terminal to obviate the formation of corona and thereby prevent high voltage break-down between the high potential terminal and nearby low potential surfaces. Additionally, the housing contemplates a corona barrier for providing an additional measure of security against corona formation. Finally, the very compact nature of the disclosed sweep transformer, as evidenced by FIG. 1, readily lends itself to portable color television receiver chassis as well as to monochrome receiver applications in which mounting space for the sweep transformer is at a premium.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A housing for supporting a television sweep transformer coil having a high potential terminal and a low potential terminal comprising:

an open cup having an internal span greater than the external diameter of said coil and an offset chamber;

said chamber comprising an internal first recess portion for receiving said high potential terminal and an internal second recess portion spatially offset from said first recess portion and having an apertured wall portion providing an egress for an output lead connected to said high potential terminal for directing said lead away from said low potential terminal to lengthen the air path between said lead and said low potential terminal, said chamber further comprising a curved member interposed between said first and second recess portions for establishing a radius of curvature for said output lead between said high potential terminal and said egress to inhibit corona formation in the vicinity of the curved portion of said lead.

2. A high voltage television sweep transformer comprising:

a core of magnetic material;

an electrical coil having predetermined internal and external diameters and having a high potential terminal and a low potential terminal;

a housing for supporting said electrical coil comprising an open cup having an internal span greater than the external diameter of said coil and a hollow post disposed therein internally dimensioned to receive said core and externally dimensioned to receive said coil;

said cup further comprising an offset chamber, said chamber comprising an internal first recess portion for receiving said high potential terminal and an internal second recess portion spatially offset from said first recess portion and having an apertured wall portion providing an egress for an output lead connected to said high potential coil terminal for directing said lead away from said low potential terminal to lengthen the air path between said lead and said low potential terminal to prevent voltage breakdown therebetween.

said chamber further comprising a curved member interposed between said first and second recess portions for establishing a radius of curvature for said output lead between said high potential terminal and said egress to inhibit corona formation about the curved portion of said lead; and a quantity of insulating compound completely enveloping said coil and said high potential terminal to further inhibit corona formation about said curved portion of said lead and said high potential terminal.

3. A high voltage television sweep transformer as set forth in claim 2 which further includes a corona barrier member disposed across the open end of said cup and in the air path between said high potential terminal and said low potential terminal of said coil.

References Cited

UNITED STATES PATENTS

| | | | |
|---|---|---|---|
| 2,956,250 | 10/1960 | Harse | 336—192 |
| 2,988,715 | 6/1961 | Gizynski et al. | 336—96 |
| 3,094,656 | 6/1963 | Miles | 336—96 XR |
| 3,155,766 | 11/1964 | Eichent et al. | 336—96 XR |
| 3,210,701 | 10/1965 | Fastner et al. | 336—208 XR |
| 3,315,198 | 4/1967 | Biesma et al. | 336—192 |

FOREIGN PATENTS

| | | |
|---|---|---|
| 1,499,015 | 9/1967 | France. |

THOMAS J. KOZMA, Primary Examiner

U.S. Cl .X.R.

336—196, 208